(12) United States Patent
Kobayashi (10) Patent No.: US 11,178,560 B2
(45) Date of Patent: Nov. 16, 2021

(54) BASE STATION AND TERMINAL SELECTION METHOD

(71) Applicant: FUJITSU LIMITED, Kawasaki (JP)

(72) Inventor: Takaharu Kobayashi, Yamato (JP)

(73) Assignee: FUJITSU LIMITED, Kawasaki (JP)

( * ) Notice: Subject to any disclaimer, the term of this patent is extended or adjusted under 35 U.S.C. 154(b) by 450 days.

(21) Appl. No.: 16/105,597

(22) Filed: Aug. 20, 2018

(65) Prior Publication Data

US 2019/0069191 A1 Feb. 28, 2019

(30) Foreign Application Priority Data

Aug. 25, 2017 (JP) .............................. JP2017-162258

(51) Int. Cl.
| | |
|---|---|
| *H04W 24/08* | (2009.01) |
| *H04L 25/02* | (2006.01) |
| *H04W 24/02* | (2009.01) |
| *H04W 88/02* | (2009.01) |
| *H04W 88/08* | (2009.01) |
| *H04L 1/00* | (2006.01) |

(52) U.S. Cl.
CPC ......... *H04W 24/08* (2013.01); *H04L 25/0202* (2013.01); *H04W 24/02* (2013.01); *H04L 1/0026* (2013.01); *H04L 25/0204* (2013.01); *H04W 88/02* (2013.01); *H04W 88/08* (2013.01); *H04W 88/085* (2013.01)

(58) Field of Classification Search
CPC ... H04W 24/08; H04W 24/02; H04W 88/085; H04W 88/02; H04W 88/08; H04L 25/0202; H04L 25/0204; H04L 1/0026
See application file for complete search history.

(56) References Cited

U.S. PATENT DOCUMENTS

| | | | |
|---|---|---|---|
| 8,019,031 B2 | 9/2011 | Yoshida et al. | |
| 2008/0316099 A1* | 12/2008 | Fujii | H04B 7/0452 342/373 |
| 2012/0213169 A1 | 8/2012 | Wang et al. | |
| 2014/0029454 A1* | 1/2014 | Yu | H04L 1/203 370/252 |

FOREIGN PATENT DOCUMENTS

| | | |
|---|---|---|
| JP | 2009-017011 A | 1/2009 |
| JP | 2013-502780 A | 1/2013 |

(Continued)

OTHER PUBLICATIONS

Seyama, T., et al., "Study of Coordinated Radio Resource Scheduling Algorithm for 5G Ultra High-Density Distributed Antenna Systems," IEICE Technical Report, 2016.

(Continued)

*Primary Examiner* — Mandish K Randhawa
(74) *Attorney, Agent, or Firm* — Arent Fox LLP (57) ABSTRACT

A base station that includes: a memory; and a processor that is connected to the memory and that is configured to: select one or more terminals to communicate with from plural terminals with which communication is possible using metric values calculated using an error correction offset value corresponding to a number of terminals being selected; and decide on at least one of a modulation scheme or a coding rate for each terminal selected.

12 Claims, 6 Drawing Sheets

(56) References Cited

FOREIGN PATENT DOCUMENTS

| | | |
|---|---|---|
| JP | 2013-128220 A | 6/2013 |
| JP | 2013-168751 A | 8/2013 |

OTHER PUBLICATIONS

Liu, J., et al., "A Low Complexity Capacity-Greedy User Selection Scheme for Zero-Forcing Beamforming," Apr. 2009.

Shikida, J., et al., "Performance Evaluation of Low Complexity Multi-User MIMO Scheduling Schemes for Massive MIMO System," IEICE Technical Report, 2016.

Communication dated Jun. 8, 2021, from the Japanese Patent Office in related application No. 2017-162258.

\* cited by examiner

BASE STATION AND TERMINAL SELECTION METHOD

CROSS-REFERENCE TO RELATED APPLICATION

This application is based upon and claims the benefit of priority of the prior Japanese Patent Application No. 2017-162258, filed on Aug. 25, 2017, the entire contents of which are incorporated herein by reference.

FIELD

The embodiments discussed herein are related to a base station and a terminal selection method.

BACKGROUND

Hitherto known technology relates to scheduling for a base station to select a terminal to communicate with from out of plural terminals with which communication is possible. For example, technology is known in which, based on a result from selecting the combination of terminals with the highest priorities for a multiplex number from out of plural terminals with which communication is possible, the highest priority terminal is selected when implementing spatial multiplexing with terminals in an already-selected (multiplex number-1).

Other known technology calculates a first transmission weight for a single-user (SU) multi-input-multi-output (MIMO) scheme and a second transmission weight for providing the greatest multi-user (MU) MIMO terminal transmission capacity. In this technology, difference information between the calculated first transmission weight and second transmission weight is transmitted to a terminal.

Technology is also known in which the combination of terminals with the greatest MU-MIMO throughput is selected from out of plural terminals based on information fed back from terminals using SU-MIMO.

Further, known technology uses orthogonality coefficients calculated from projection channel vectors to calculate a received signal-to-interference-plus-noise ratio (SINR) for terminals in a MU-MIMO system.

RELATED PATENT DOCUMENTS

Japanese Laid-Open Patent Publication No. 2013-128220
Japanese Laid-Open Patent Publication No. 2013-168751
Japanese National Phase Publication No. 2013-502780
Japanese Laid-Open Patent Publication No. 2009-017011

SUMMARY

According to an aspect of the embodiments, a base station includes: a memory; and a processor that is connected to the memory and that is configured to: select one or more terminals to communicate with from plural terminals with which communication is possible using metric values calculated using an error correction offset value corresponding to a number of terminals being selected; and decide on at least one of a modulation scheme or a coding rate for each terminal selected.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Detailed explanation follows regarding exemplary embodiments of technology disclosed herein, with reference to the drawings. Note that in the following exemplary embodiments, technology disclosed herein is applied to terminal scheduling in downlink communication.

First Exemplary Embodiment

Figure 1:
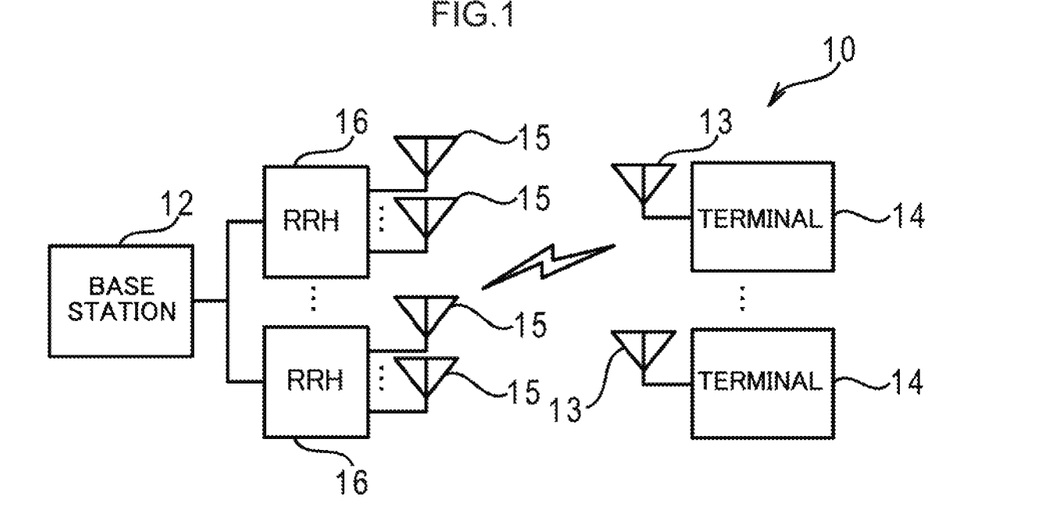
FIG. 1 is a block diagram illustrating a schematic configuration of a communication system according to exemplary embodiments herein.

Explanation follows regarding the configuration of a communication system 10 according to a first exemplary embodiment, with reference to FIG. 1. As illustrated in FIG. 1, the communication system 10 includes a base station 12, and plural terminals 14 each provided with one antenna element 13. The terminals 14 may also be referred to as user equipment (UE).

The base station 12 is connected to plural remote radio heads (RRH) 16 each provided with plural antenna elements 15. Each of the plural terminals 14 is positioned in an area covered by the base station 12 and is capable of communicating with the base station 12. The base station 12 and the terminals 14 communicate wirelessly using respective antenna elements 13 and antenna elements 15.

Figure 2:
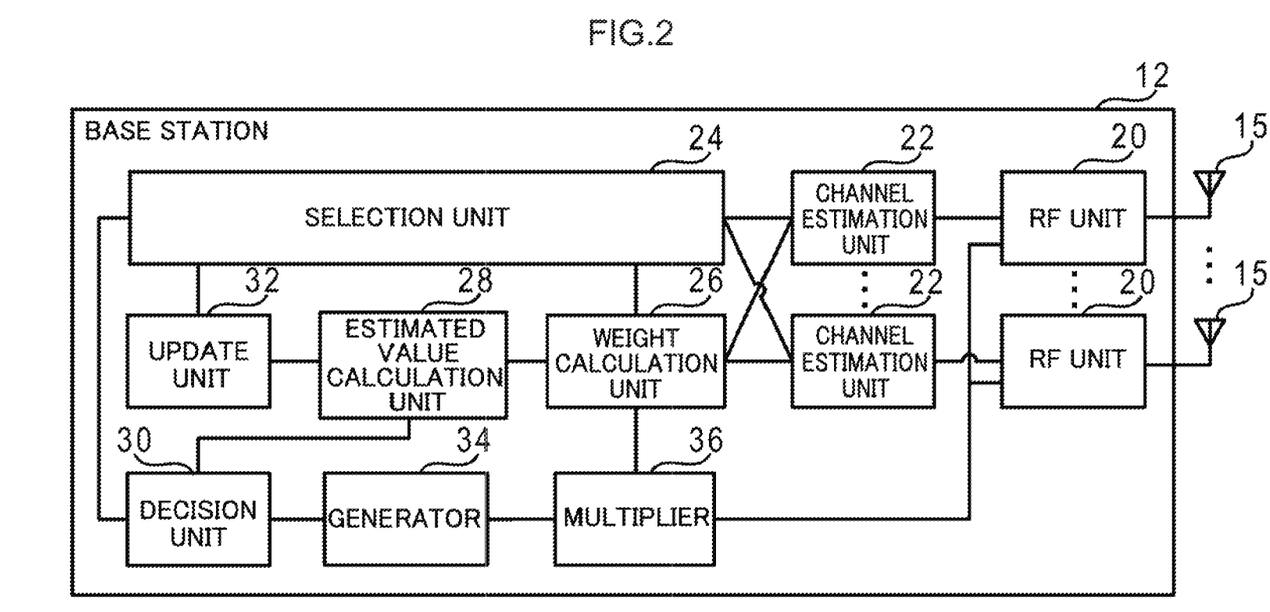
FIG. 2 is a functional block diagram of a base station according to a first exemplary embodiment.

Explanation follows regarding the functional configuration of the base station 12 according to the present exemplary embodiment with reference to FIG. 2. Note that in the present exemplary embodiment, a functional configuration of the base station 12 is explained in which, for example, the base station 12 selects terminals 14 to communicate with using spatial multiplexing, such as MU-MIMO, in which plural terminals 14 are communicated with at the same timing and at the same frequency. As illustrated in FIG. 2, the base station 12 includes radio frequency (RF) units 20, channel estimation units 22, a selection unit 24, a weight calculation unit 26, an estimated value calculation unit 28, a decision unit 30, an update unit 32, a generator 34, and a multiplier 36.

The RF units 20 are provided in one-to-one correspondence with the antenna elements 15. The RF units 20 receive signals transmitted from the terminals 14 through the respective antenna elements 15. The RF units 20 perform processing to convert received signals from analog signals into digital signals in addition to performing prescribed reception processing, such as a fast Fourier transformation. The RF units 20 output the signals obtained via the reception processing to the channel estimation units 22.

The RF units 20 also perform prescribed transmission processing, such as an inverse fast Fourier transformation and processing to convert digital signals into analog signals, on user data to be transmitted that has been generated by the generator 34, described below, and that the multiplier 36, described below, has multiplied by a transmission weight. The RF units 20 transmit signals expressing user data obtained via transmission processing using the antenna elements 15.

The channel estimation units 22 are provided in one-to-one correspondence with the RF units 20. The channel estimation units 22 use known uplink reference signals transmitted from terminals 14 to perform channel estimation. The channel estimation units 22 take channel symmetry into account to convert estimated channel values that employ uplink reference signals into estimated downlink channel values, and the channel estimation units 22 output the estimated channel values obtained via conversion to the selection unit 24 and the weight calculation unit 26. Note that the channel estimation units 22 may perform channel estimation using information fed back using downlink reference signals received by the terminals 14.

The selection unit 24 performs scheduling by selecting, for each subframe, one or more terminals 14 to communicate with from out of all of the terminals 14 with which communication is possible. The selection unit 24 according to the present exemplary embodiment repeats processing in which one unselected terminal 14 is added to a group of selected terminals 14 until a predetermined condition has been satisfied. The selection unit 24 then selects the group of terminals 14 selected when the predetermined condition is satisfied as the terminals 14 to communicate with. Note that the number of terminals 14 selected by the selection unit 24 is equal to a multiplex number in spatial multiplexing at which plural terminals 14 are communicated with at the same timing and at the same frequency.

Specifically, the selection unit 24 calculates estimated values expressed as follows, wherein A is the group of terminals 14 selected through a k−1$^{th}$ multiplex and R is the group of unselected terminals 14. Namely, when a terminal 14 #n included in group R is added to group A in a k$^{th}$ multiplex, the selection unit 24 calculates an estimated reception quality value for each terminal 14 included in group A and for the terminal 14 #n. In the present exemplary embodiment, the selection unit 24 calculates estimated SINR values as estimated reception quality values at each terminal 14 in accordance with Equation (1) below.

$$\tilde{\gamma}_{k,n,m} = \frac{\|h_m\|^2 P_{total}}{(|A|+1)\sigma_m^2}\left(1 - \sum_{\substack{j\in(A\cup n)\\j\neq m}} \frac{|h_m h_j^H|^2}{\|h_m\|^2\|h_j\|^2}\right) \quad (1)$$

Note that Equation (1) is an approximate expression in which matrix calculations are approximated to reduce the amount of calculation. In Equation (1), $\tilde{\gamma}$k,n,m represents the estimated SINR value for terminal 14 #m in the k$^{th}$ multiplex when terminal 14 #n has been added to group A. Further, in Equation (1), $P_{total}$ represents the overall transmission power of the base station 12, and $\sigma_m^2$ represents the power of noise interference at terminal 14 #m. Note that $P_{total}$ and $\sigma_m^2$ are found in advance using known methods. Further, |•| is used to indicate absolute value or the size of a group, and ||•|| is used to indicate a norm. Further, in Equation (1), $h_i$ represents a channel estimation result vector from the channel estimation units 22 for a terminal 14 #i, as expressed in Equation (2) below.

$$h_i = [h_{i,1} h_{i,2} \ldots h_{i,N_{tx}}] \quad (2)$$

Note that in Equation (2), $h_{i,j}$ represents the channel estimation result for a terminal 14 #i that has been estimated by the channel estimation units 22 using the reference signal received by antenna elements 15 #j. In Equation (2), $N_{tx}$ represents the number of antenna elements 15.

In accordance with Equation (3) below, the selection unit 24 also calculates a metric value that is used to determine whether or not to add terminal 14 #n to group A in multiplex number k.

$$M_{k,n} = \sum_{m\in(A\cup n)} \frac{R\left(\tilde{\gamma}_{k,n,m} 10^{\frac{\Delta_k}{10}}\right)}{\overline{R}_m} \quad (3)$$

Note that in Equation (3), $M_{k,n}$ represents the metric value used to determine whether or not to add terminal 14 #n to group A in multiplex number k. Further, in Equation (3), R( ) is a function that converts a SINR value into a data rate, and $\overline{R}_m$ is an average data rate for terminal 14 #m. Further, in Equation (3), Δk is an offset value used for error correction of the relevant estimated SINR value $\tilde{\gamma}$k,n,m described above. $\Delta_k$ is calculated by the update unit 32, described below. Note that the initial value of $\Delta_k$ may be 0, or may be determined in advance for each multiplex number (for integer values from 1 to the maximum multiplex number) by computer simulation.

Namely, the selection unit 24 calculates a sum value, expressed below, as the metric value $M_{k,n}$ used to determine whether or not to add terminal 14 #n to group A in the k$^{th}$ multiplex. In this case, as the metric value $M_{k,n}$, the selection unit 24 calculates a value summing ratios of average throughputs to instantaneous throughputs corrected using the offset values $\Delta_k$ for each terminal 14 included in group A and for terminal 14 #n.

The selection unit 24 calculates a metric value $M_{k,n}$ whenever an unselected terminal 14 is added to group A. When the maximum value $M_{k,max}$ of the calculated metric values $M_{k,n}$ is greater than the maximum value $M_{k-1,max}$ of metric values $M_{k-1,n}$ in the k−1$^{th}$ multiplex (namely, the metric values for the group A of selected terminals 14), the selection unit 24 adds the terminal 14 #n with the metric value $M_{k,n}$ equal to the maximum value $M_{k,max}$ to group A. When this occurs, the selection unit 24 also removes this terminal 14 #n from group R.

The selection unit 24 repeats the above processing until either the maximum value $M_{k,max}$ of the metric values is less than or equal to the maximum value $M_{k-1,max}$, or the number of terminals 14 included in group A reaches the maximum multiplex number. The selection unit 24 selects the terminals 14 ultimately included in group A as the terminals 14 to communicate with. In the following, $N_{mu}$ represents the number of terminals 14 selected by the selection unit 24 (namely, the multiplex number).

The selection unit 24 also retains estimated SINR values $\Gamma_m$ for the terminals 14 ultimately included in the group A. Estimated values $\Gamma_m$ are expressed by Equation (4) below, wherein the last terminal 14 added to group A is denoted terminal 14 #a.

$$\Gamma_m = \tilde{\gamma}_{N_{mu},a,m} \quad (4)$$

The weight calculation unit 26 calculates transmission weights for terminals 14 selected by the selection unit 24. In the present exemplary embodiment, the weight calculation unit 26 uses a zero-forcing (ZF) algorithm to calculate transmission weights W in accordance with Equations (5) and (6) below.

$$W = \tilde{W} P \tag{5}$$

$$\tilde{W} = H_A^H (H_A H_A^H)^{-1} \tag{6}$$

Note that in Equation (5), P is a diagonal matrix for normalizing transmission weight power values. P is expressed using Equation (7) below using pre-normalization transmission weights $\tilde{W}$. In Equation (6), $H_A$ is a concatenated channel matrix that consolidates the channel estimation results from the channel estimation units 22 for each terminal 14 selected by the selection unit 24.

$$P = \sqrt{\frac{P_{total}}{N_{mu}}} \operatorname{diag}\left\{\frac{1}{\|(\tilde{W})_1\|}, \ldots, \frac{1}{\|(\tilde{W})_{N_{mu}}\|}\right\} \tag{7}$$

Note that in Equation (7), $(\tilde{W})_i$ represents the $i^{th}$ column vector in $\tilde{W}$.

The estimated value calculation unit 28 calculates estimated reception quality values for each terminal 14 selected by the selection unit 24 using the transmission weights W calculated by the weight calculation unit 26. In the present exemplary embodiment, the estimated value calculation unit 28 calculates estimated SINR values $\gamma_m$ as estimated reception quality values for the terminals 14 in accordance with Equation (8) below.

$$\gamma_m = \frac{1}{\|(W)_m\|^2 \sigma_m^2} \tag{8}$$

The decision unit 30 uses the estimated values $\gamma_m$ calculated by the estimated value calculation unit 28 to decide on the modulation scheme and coding rate (MCS) for the terminals 14 selected by the selection unit 24.

The update unit 32 updates an offset value $\Delta_{N_{mu}}$ corresponding to the number $N_{mu}$ of terminals 14 selected by the selection unit 24 using a difference between the first estimated values m calculated by the selection unit 24 and the second estimated values $\gamma_m$ calculated by the estimated value calculation unit 28. In the present exemplary embodiment, the update unit 32 calculate s the offset value $\Delta_{N_{mu}}$ by dividing a value summing the differences $\delta_m$ between the first estimated values $\Gamma_m$ and the second estimated values $\gamma_m$ for each terminal 14 selected by the selection unit 24 by $N_{mu}$, in accordance with Equations (9) and (10) below. Namely, the offset value $\Delta_k$ in Equation (3) used in subsequent selection processing carried out by the selection unit 24 is updated thereby.

$$\Delta_{N_{mu}} = \frac{1}{N_{mu}} \sum_{m \in A} \delta_m \tag{9}$$

$$\delta_m = 10 \log(\gamma_m) - 10 \log(\Gamma_m) \tag{10}$$

Note that the update unit 32 may employ the offset value $\Delta_k$ as a forgetting factor. Further, in cases in which there is a tendency for the offset value $\Delta_k$ to have a negative sign and the absolute value thereof to grow increasingly larger as the multiplex number k increases, in accordance with Equation (11) below, $\overline{\Delta}_k$ may be used in place of the offset value $\Delta_k$. Namely, as the offset value $\Delta_k$ for multiplex number k, the update unit 32 may employ the smallest offset value $\Delta_k$ for multiplex numbers no greater than k.

$$\tilde{\Delta}_k = -\max_{i \leq k}(|\Delta_i|) \tag{11}$$

The generator 34 generates digital signals that express user data in accordance with the modulation scheme and coding rate decided on by the decision unit 30. The multiplier 36 multiplies digital signals generated by the generator 34 by transmission weights W calculated by the weight calculation unit 26, and outputs signals obtained via transmission weight W multiplication to the RF units 20.

Figure 3:
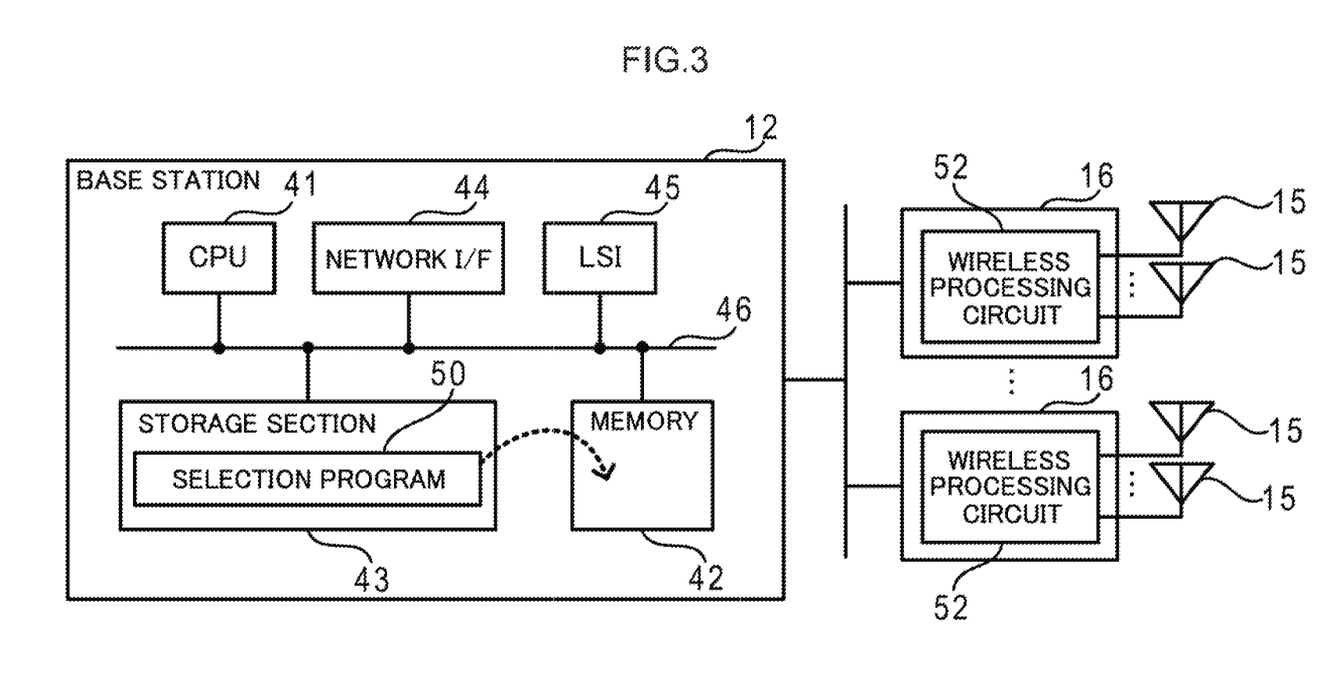
FIG. 3 is a block diagram illustrating hardware configuration for a base station according to exemplary embodiments herein.

Next, explanation follows regarding hardware configuration for the base station 12 according to the present exemplary embodiment, with reference to FIG. 3. As illustrated in FIG. 3, the base station 12 includes a central processing unit (CPU) 41, memory 42 serving as a temporary storage region, and a non-volatile storage section 43. The base station 12 further includes a network I/F 44 connected to a core network or the like, and large scale integrated circuitry (LSI) 45. The CPU 41, the memory 42, the storage section 43, the network I/F 44, and the LSI 45 are connected to one another via a bus 46. The base station 12 communicates with the terminals 14 using the antenna elements 15 and a wireless processing circuit 52 provided to each RRH 16

The storage section 43 may be implemented by a hard disk drive (HDD), a solid state drive (SSD), flash memory, or the like. A selection program 50 is stored in the storage section 43, which serves as a storage medium. The CPU 41 reads the selection program 50 from the storage section 43, deploys the read selection program 50 into the memory 42, loads the deployed selection program 50 into the CPU 41 and executes the loaded selection program 50. As a result of executing the selection program 50, the CPU 41 functions as the channel estimation units 22, the selection unit 24, the weight calculation unit 26, the estimated value calculation unit 28, the decision unit 30, the update unit 32, the generator 34, and the multiplier 36 illustrated in FIG. 2. The RF units 20 are implemented using the LSI 45. Note that the CPU 41 is a hardware processor.

The functionality implemented by the selection program 50 may also be implemented by a semiconductor integrated circuit, and more specifically by an application-specific integrated circuit (ASIC).

Figure 4:
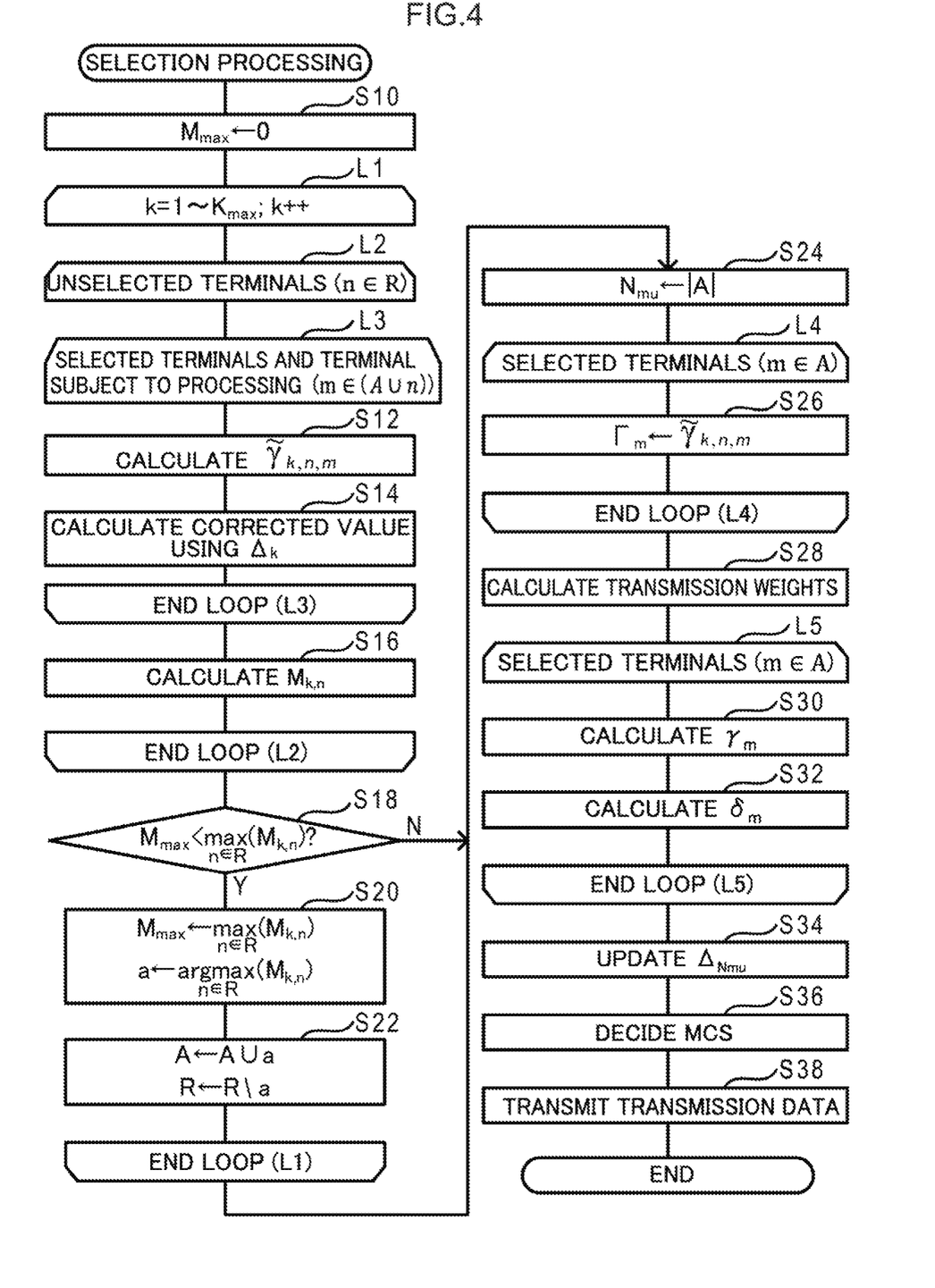
FIG. 4 is a flowchart illustrating an example of selection processing according to the first exemplary embodiment.

Next, explanation follows regarding operation of the base station 12 according to the present exemplary embodiment, with reference to FIG. 4. The base station 12 executes the selection processing illustrated in FIG. 4 as a result of executing the selection program 50. The selection processing illustrated in FIG. 4 is, for example, executed when user data to be transmitted is generated.

At step S10 of the selection processing illustrated in FIG. 4, the selection unit 24 initializes a variable $M_{max}$ for storing a maximum value of the metric values $M_{k,n}$ to 0. Next, the processing of loop L1 is repeatedly executed as the multiplex number k is incremented from 1 to a maximum multiplex number $K_{max}$. Further, the processing of a subsequent loop L2 is repeatedly executed such that each terminal 14 #n in the group R of unselected terminals 14 is subject to processing. Further, the processing of a subsequent loop L3 is repeatedly executed for each terminal 14 #m, these being the selected terminals 14 included in group A and the terminal 14 #n subject to processing in loop L2.

At step S12, the selection unit 24 calculates an estimated reception quality value $\tilde{\gamma}_{k,n,m}$ for terminal 14 #m in accordance with Equation (1) using channel estimation results estimated in advance by the channel estimation units 22 for the terminal 14 #m.

Next, at step S14, the selection unit 24 uses the offset value $\Delta_k$ corresponding to the current multiplex number k to calculate a corrected value $$\tilde{\gamma}_{k,n,m} 10^{\frac{\Delta_k}{10}}$$

that corrects the estimated value calculated at step S12.

At step S16, the selection unit 24 uses the corrected values calculated at step S14 to calculate a metric value $M_{k,n}$ in accordance with Equation (3). At step S18, the selection unit 24 makes a determination as to whether or not the maximum value $M_{k,max}$ of the metric values $M_{k,n}$ calculated at step S16 is greater than $M_{max}$. In cases in which this determination is affirmative, processing transitions to step S20.

At step S20, the selection unit 24 stores the maximum value $M_{k,max}$ of the metric values $M_{k,n}$ calculated at step S16 in the variable $M_{max}$. The selection unit 24 also marks the terminal 14 with the metric value $M_{k,n}$ equal to the maximum value $M_{k,max}$ as the terminal 14 #a last added to group A. Next, at step S22, the selection unit 24 adds terminal 14 #a to group A. The selection unit 24 then removes terminal 14 #a from group R.

In cases in which a negative determination was made at step S18, loop L1 is exited and processing transitions to step S24. At step S24, the selection unit 24 stores the size of group A, namely the number of selected terminals 14, as multiplex number $N_{mu}$. Next, the processing of loop L4 is repeatedly executed such that each terminal 14 #m in group A, namely each terminal 14 #m selected by the selection unit 24, is subject to processing.

At step S26, the selection unit 24 retains the estimated value calculated at step S12 for each terminal 14 #m as an estimated value $\Gamma_m$ in accordance with Equation (4). At step S28, the weight calculation unit 26 calculates transmission weights W for the terminals 14 selected by the selection unit 24 in accordance with Equation (5).

Next, the processing of loop L5 is repeatedly executed such that each terminal 14 #m selected by the selection unit 24 is subject to processing. At step S30, the estimated value calculation unit 28 uses the transmission weights W calculated at step S28 to calculate an estimated reception quality value $\gamma_m$ for each terminal 14 #m in accordance with Equation (8). Next, at step S32, the update unit 32 calculates a difference $\delta_m$ between the corresponding first estimated value $\Gamma_m$ retained at step S26 and the second estimated value $\gamma_m$ calculated at step S30 in accordance with Equation (10).

At step S34, the update unit 32 updates the offset value $\Delta_{Nmu}$ by using the differences $\delta_m$ calculated at step S32 to calculate the offset value $\Delta_{Nmu}$ for multiplex number $N_{mu}$ in accordance with Equation (9). The offset value $\Delta_{Nmu}$ updated at step S34 is employed in the processing of step S14 starting the next time the selection processing is executed.

Next, at step S36, the decision unit 30 uses the estimated values $\gamma_m$ calculated at step S30 to decide on a modulation scheme and coding rate for the terminals 14 selected by the selection unit 24. At step S38, the generator 34 generates digital signals that express user data in accordance with the modulation scheme and coding rate decided on at step S36. The multiplier 36 then multiplies digital signals generated by the generator 34 by the transmission weights W calculated at step S28, and outputs signals obtained via transmission weight W multiplication to the RF units 20. The RF units 20 perform the aforementioned prescribed transmission processing on signals expressing user data that have been input from the multiplier 36. The RF units 20 transmit the signals expressing user data obtained via transmission processing using the antenna elements 15. The selection processing ends when the processing of step S38 is complete.

As described above, in the present exemplary embodiment, an offset value corresponding to a number of selected terminals 14 is used to correct estimated reception quality values for the terminals 14, and the corrected estimated values are used to calculate metric values. Being able to select an appropriate combination of terminals 14 enables a drop in communication throughput to be suppressed.

In the present exemplary embodiment, first estimated reception quality values for the terminals 14 are calculated using an approximate expression (Equation (1)) having a reduced amount of calculation. Second estimated reception quality values for the terminals 14 are calculated using transmission weights. In processing to calculate first estimated values, the processing at step S12 of the selection processing above is predominantly performed on combinations of large numbers of terminals 14. In contrast, in the processing to calculate second estimated values, the processing at step S30 of the selection processing above is only performed on combinations of terminals 14 selected by the selection unit 24. Namely, in the present exemplary embodiment, first estimated values to be calculated many times are calculated using an approximate expression having a reduced amount of calculation, and second estimated values to be calculated for each combination of selected terminals 14 are calculated using matrix calculations that involve a greater amount of calculation than in the approximate expression but have high estimation accuracy.

In the present exemplary embodiment, differences between the first estimated values and the second estimated values are then used to calculate an offset value. This enables a drop in communication throughput to be suppressed while reducing an amount of calculation.

In the present exemplary embodiment, terminal 14 selection is aborted in cases in which the maximum value of the metric values when unselected terminals 14 were added to a group A of selected terminals 14 is less than or equal to the metric values for the selected terminals 14. This enables an amount of calculation to be reduced compared to when metric values are calculated for all combinations of terminals 14 and the combination of terminals 14 for which the calculated metric values are highest is selected.

Second Exemplary Embodiment

Explanation follows regarding a second exemplary embodiment of technology disclosed herein. Note that since the configuration of the communication system 10 according to the present exemplary embodiment is similar to that in the first exemplary embodiment, explanation thereof will not be given. The present exemplary embodiment differs from the first exemplary embodiment in that information fed back from the terminals 14 is used when the base station 12 calculates offset values.

Figure 5:
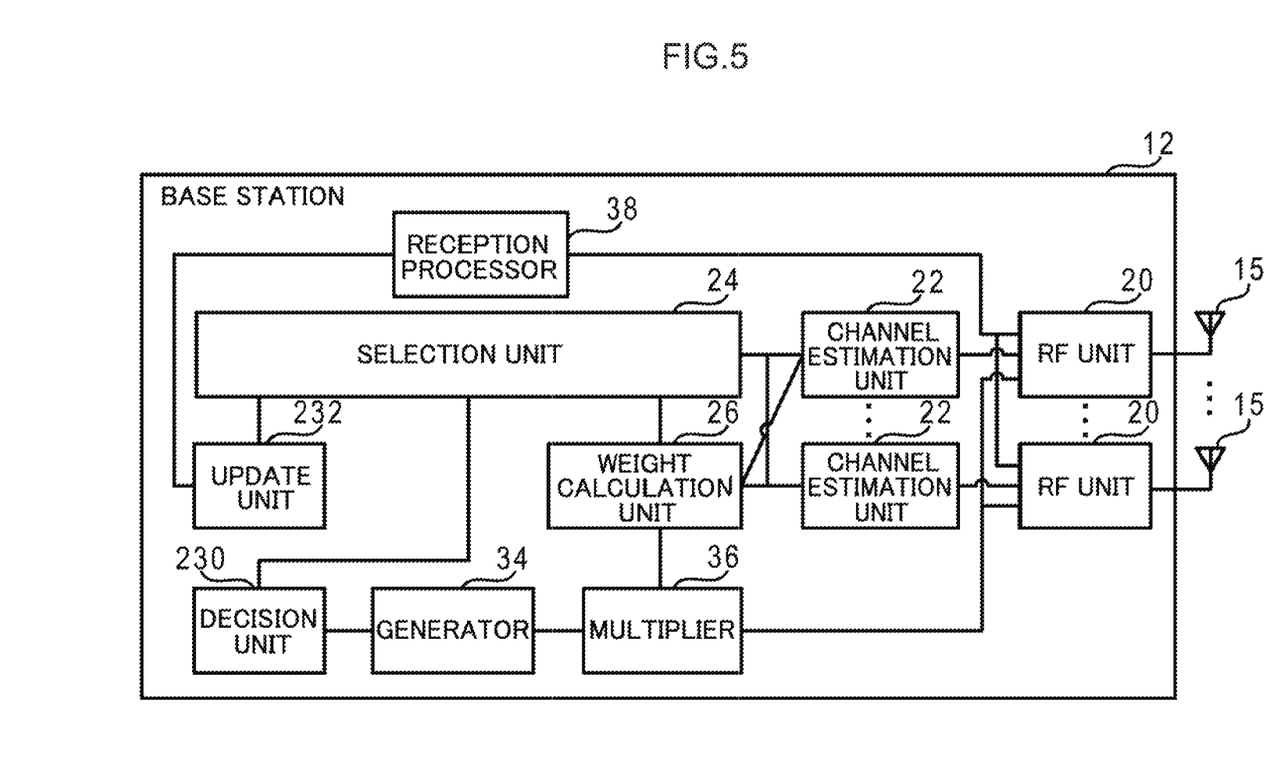
FIG. 5 is a functional block diagram of a base station according to a second exemplary embodiment.

Explanation follows regarding the functional configuration of the base station 12 according to the present exemplary embodiment, with reference to FIG. 5. Note that in FIG. 5, functional portions with identical function to a functional portion in FIG. 2 are appended with the same reference number as in FIG. 2, and explanation thereof will not be given.

As illustrated in FIG. 5, the base station 12 according to the present exemplary embodiment includes RF units 20, channel estimation units 22, a selection unit 24, a weight calculation unit 26, a decision unit 230, an update unit 232, a generator 34, a multiplier 36, and a reception processor 38.

The decision unit 230 uses estimated reception quality values $\Gamma_m$ for terminals 14 that have been retained by the selection unit 24 to decide on the modulation scheme and coding rate for the terminals 14 selected by the selection unit 24.

The reception processor 38 receives response information from the terminals 14 via the RF units 20 in cases in which user data employing the modulation scheme and coding rate decided on by the decision unit 230 has been transmitted to the terminals 14 selected by the selection unit 24. Note that in the present exemplary embodiment, the terminals 14 employ a cyclic redundancy check (CRC) to verify user data that has been received. In cases in which the received user data is good, as the response information the terminals 14 return an acknowledgement (ACK) to the base station 12 to indicate that the user data was received correctly. However, in cases in which a terminal 14 detects an error in the received user data, a negative acknowledgement (NACK) is returned to the base station 12 as the response information to indicate that there was a problem receiving the user data.

The update unit 232 uses the response information received by the reception processor 38 to update the offset value corresponding to the number of terminals 14 selected by the selection unit 24. In the present exemplary embodiment, the update unit 232 updates the offset value $\Delta_{Nmu}$ by calculating the offset value $\Delta_{Nmu}$ corresponding to the number $N_{mu}$ of terminals 14 selected by the selection unit 24 in accordance with Equation (12) below.

$$\Delta_{Nmu} = \Delta_{Nmu} + \sum_{m \in A} \alpha\{Tx_m - (1 - x_m)(1 - T)\} \quad (12)$$

Note that in Equation (12), T represents a target value (a value from 0 to 1) for the block error rate (BLER), and α is a coefficient for adjusting the speed at which the BLER converges on the target value. Further, in Equation (12), $x_m$ is a variable representing the response information from terminal 14 #m. $x_m=1$ for ACK response information, and $x_m=0$ for NACK response information. Namely, in the present exemplary embodiment, the higher the incidence of NACK, the smaller the value added to the latest offset value $\Delta_{Nmu}$ to update the offset value $\Delta_{Nmu}$.

Hardware configuration for the base station 12 according to the present exemplary embodiment is the same as that for the base station 12 according to the first exemplary embodiment. As a result of executing the selection program 50, the CPU 41 functions as the channel estimation units 22, the selection unit 24, the weight calculation unit 26, the decision unit 230, the update unit 232, the generator 34, the multiplier 36, and the reception processor 38 illustrated in FIG. 5.

Figure 6:
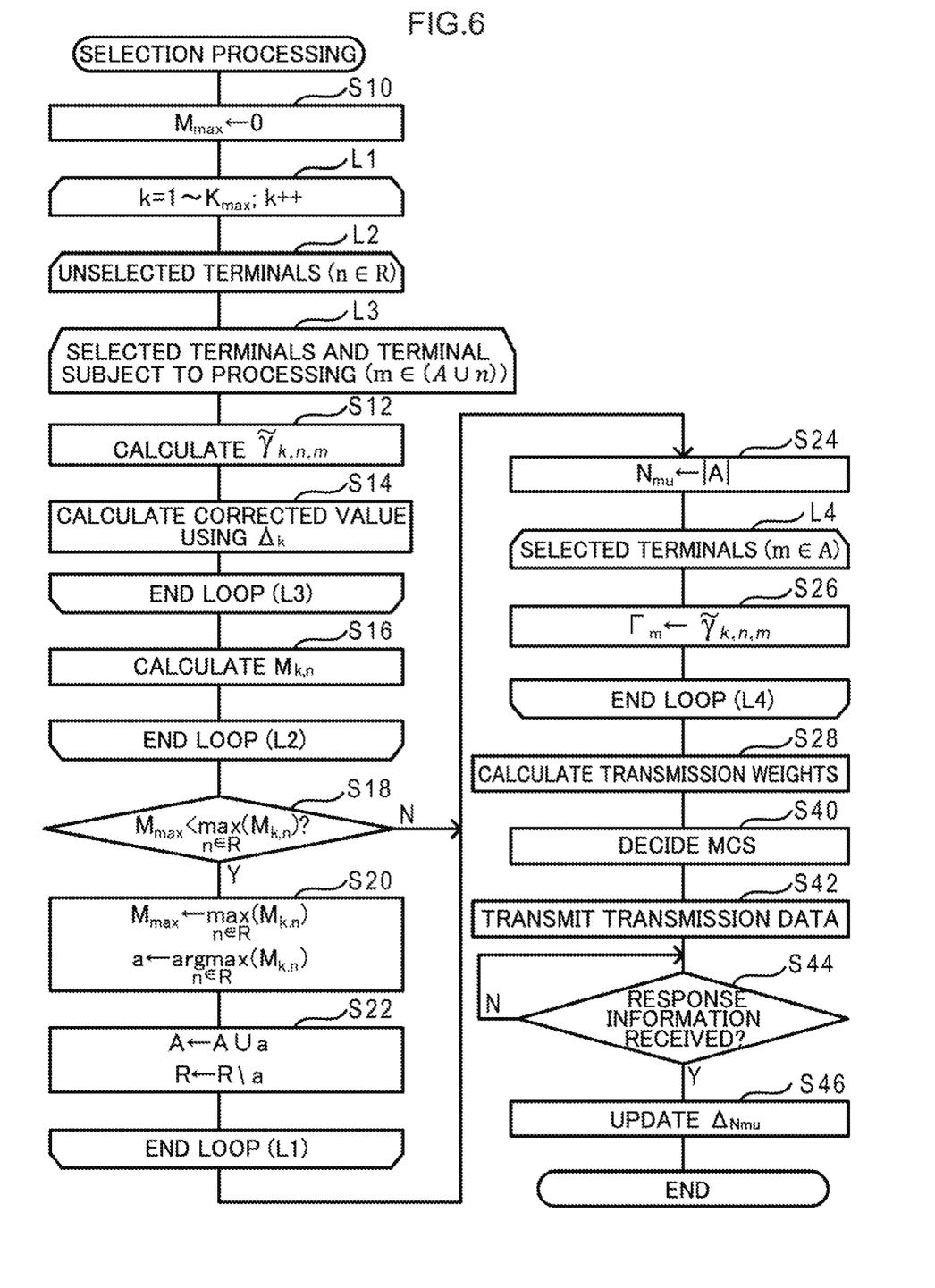
FIG. 6 is a flowchart illustrating an example of selection processing according to the second exemplary embodiment.

Explanation follows regarding operation of the base station 12 according to the present exemplary embodiment, with reference to FIG. 6. The base station 12 executes the selection processing illustrated in FIG. 6 as a result of executing a selection program 50. The selection processing illustrated in FIG. 6 is, for example, executed when user data to be transmitted is generated. Note that steps in FIG. 6 that execute processing identical to that in FIG. 4 are appended with the same reference number as in FIG. 4, and explanation thereof will not be given.

At step S40 of the selection processing illustrated in FIG. 6, the decision unit 230 uses the estimated values $\Gamma_m$ retained at step S26 to decide on the modulation scheme and coding rate for the terminals 14 selected by the selection unit 24. Next, at step S42, the generator 34 generates digital signals that express user data in accordance with the modulation scheme and coding rate decided on at step S40. The multiplier 36 then multiplies digital signals generated by the generator 34 by the transmission weights W calculated at step S28, and outputs signals obtained via transmission weight W multiplication to the RF units 20. The RF units 20 perform the aforementioned prescribed transmission processing on signals expressing user data that have been input from the multiplier 36. The RF units 20 transmit the signals expressing user data obtained via transmission processing using the antenna elements 15.

Next, at step S44, the reception processor 38 stands by until response information is received from each terminal 14 selected by the selection unit 24 for the user data transmitted at step S42. When the reception processor 38 has received response information from each terminal 14, affirmative determination is made at step S44, and processing transitions to step S46. At step S46, the update unit 232 uses the response information received at step S44 to calculate the offset value $\Delta_{Nmu}$ corresponding to the number $N_{mu}$ of terminals 14 selected by the selection unit 24, thereby updating the offset value $\Delta_{Nmu}$ in accordance with Equation (12). The offset value $\Delta_{Nmu}$ updated at step S46 is employed in the processing of step S14 starting the next time the selection processing is executed. The selection processing ends when the processing of step S46 is complete.

As described above, in the present exemplary embodiment, response information fed back from terminals 14 that have received user data is used to update the offset value. The accuracy of the offset value is thus increased, enabling a drop in communication throughput to be suppressed.

Note that although the above exemplary embodiments have been explained using an example in which each terminal 14 is provided with a single antenna element 13, there is no limitation thereto. For example, each terminal 14 may be provided with plural antenna elements 13. In such cases, selection processing similar to in the above exemplary embodiments may be executed in which each antenna element 13 is considered to be a terminal 14. Here, configuration may be such that user data is transmitted to the selected antenna element 13 of terminals 14 for which one antenna element 13 has been selected. Configuration may also be such that user data is transmitted, via multistreaming, to plural selected antenna elements 13 of terminals 14 for which plural antenna elements 13 have been selected.

In cases in which terminals 14 are provided with plural antenna elements 13, an estimated reception quality value may be calculated for each antenna element 13, and the average value of the estimated values calculated for the antenna elements 13 provided to a given terminal 14 may be employed as the estimated reception quality value for that terminal 14.

Further, although the above exemplary embodiments have been explained using an example in which the decision unit 30, 230 decides on both the modulation scheme and coding rate, there is no limitation thereto. Configuration may be such that the decision unit 30, 230 decides on one of either a modulation or a coding scheme. In such cases, the other of a modulation or a coding scheme that was not decided by the decision unit 30, 230 may be determined in advance, or may be decided using a known method.

Further, although the above exemplary embodiments have been explained using an example in which technology disclosed herein is applied to selection processing for terminals 14 in a downlink, there is no limitation thereto. Configuration may be such that technology disclosed herein is applied to selection processing for terminals 14 in an uplink.

Further, although the above exemplary embodiments have been explained using an example in which SINR values are employed as values expressing reception quality at terminals 14, there is no limitation thereto. Values other than SINR values that express reception quality may be employed as a values to express reception quality at terminals 14.

Further, although the above exemplary embodiments have been explained using an example in which a selection program 50 has been stored (installed) on the storage section 43 in advance, there is no limitation thereto. The selection program 50 may be provided in a format stored on a non-transitory recording medium such as a CD-ROM, DVD-ROM, USB memory, or a memory card.

When using metric values to select a terminal to communicate with from out of plural terminals with which communication is possible, the metric values may contain error, for example error in terminal reception quality estimations. In such cases, communication throughput may drop as a result of not being able to select an appropriate combination of terminals due to this error. The related technologies give no consideration to error contained in metric values.

An object of one aspect of technology disclosed herein is to enable a drop in communication throughput to be suppressed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A base station comprising:
    a memory; and
    a processor that is connected to the memory and that is configured to:
        select one or more terminals to communicate with from plural terminals with which communication is possible using metric values calculated using an error correction offset value that is calculated using a number of terminals being selected;
        decide on at least one of a modulation scheme or a coding rate for each terminal selected;
        calculate the metric values using the offset value and first estimated values for terminal reception quality calculated from a channel estimation result using an approximate expression,
        calculate a transmission weight for each selected terminal;
        calculate a second estimated value for reception quality at each selected terminal using the calculated transmission weights; and
        update the offset value that is calculated using the number of selected terminals using a difference between the first estimated values and the second estimated values.

2. The base station of claim 1, wherein:
    the processor is further configured to select the one or more terminals to communicate with by repeating processing in which, in a case in which a maximum value of the metric values calculated using the offset value that is calculated using to the number of terminals in a case in which any of unselected terminals has been added to a group of selected terminals is larger than the metric values calculated using the offset value that is calculated using the number of selected terminals, an unselected terminal with a largest metric value is added to the group of selected terminals, until either the maximum value is less than or equal to the metric values calculated using the offset value that is calculated using the number of selected terminals or the number of selected terminals is equal to a maximum number for the terminals being selected.

3. The base station of claim 1, wherein the number of terminals being selected is equal to a multiplex number in spatial multiplexing at which plural terminals are communicated with at a same timing and at a same frequency.

4. A base station comprising:
    a memory; and
    a processor that is connected to the memory and that is configured to:
        select one or more terminals to communicate with from plural terminals with which communication is possible using metric values calculated using an error correction offset value that is calculated using a number of terminals being selected;
        decide on at least one of a modulation scheme or a coding rate for each terminal selected;
        calculate the metric values using the offset value and estimated values for terminal reception quality calculated from a channel estimation result using an approximate expression; and
        update the offset value that is calculated using the number of selected terminals using terminal response information in a case in which user data have been transmitted to each selected terminal using the at least one of the decided modulation scheme or coding rate.

5. The base station of claim 4, wherein:
    the processor is further configured to select the one or more terminals to communicate with by repeating processing in which, in a case in which a maximum value of the metric values calculated using the offset value that is calculated using to the number of terminals in a case in which any of unselected terminals has been added to a group of selected terminals is larger than the metric values calculated using the offset value that is calculated using the number of selected terminals, an unselected terminal with a largest metric value is added to the group of selected terminals, until either the maximum value is less than or equal to the metric values calculated using the offset value that is calculated using the number of selected terminals or the number of selected terminals is equal to a maximum number for the terminals being selected.

6. The base station of claim 4, wherein the number of terminals being selected is equal to a multiplex number in spatial multiplexing at which plural terminals are communicated with at a same timing and at a same frequency.

7. A terminal selection method comprising:
by a processor in a base station,
selecting one or more terminals to communicate with from plural terminals with which communication is possible using metric values calculated using an error correction offset value that is calculated using a number of terminals being selected;
deciding on at least one of a modulation scheme or a coding rate for each selected terminal;
calculating the metric values using the offset value and first estimated values for terminal reception quality calculated from a channel estimation result using an approximate expression;
calculating a transmission weight for each selected terminal;
calculating a second estimated value for reception quality at each selected terminal using the calculated transmission weights; and
updating the offset value that is calculated using the number of selected terminals using a difference between the first estimated values and the second estimated values.

8. The terminal selection method of claim 7, further comprising:
selecting the one or more terminals to communicate with by repeating processing in which, in a case in which a maximum value of the metric values calculated using the offset value that is calculated using the number of terminals in a case in which any of unselected terminals has been added to a group of selected terminals is larger than the metric values calculated using the offset value that is calculated using the number of selected terminals, an unselected terminal with a largest metric value is added to the group of selected terminals, until either the maximum value is less than or equal to the metric values calculated using the offset value that is calculated using the number of selected terminals or the number of selected terminals is equal to a maximum number for the terminals being selected.

9. The terminal selection method of claim 7, wherein the number of terminals being selected is equal to a multiplex number in spatial multiplexing at which plural terminals are communicated with at a same timing and at a same frequency.

10. A terminal selection method comprising:
by a processor in a base station,
selecting one or more terminals to communicate with from plural terminals with which communication is possible using metric values calculated using an error correction offset value that is calculated using a number of terminals being selected;
deciding on at least one of a modulation scheme or a coding rate for each selected terminal;
calculating the metric values using the offset value and estimated values for terminal reception quality calculated from a channel estimation result using an approximate expression; and
updating the offset value that is calculated using the number of selected terminals using terminal response information in a case in which user data have been transmitted to each selected terminal using the at least one of the decided modulation scheme or coding rate.

11. The terminal selection method of claim 10, further comprising:
selecting the one or more terminals to communicate with by repeating processing in which, in a case in which a maximum value of the metric values calculated using the offset value that is calculated using the number of terminals in a case in which any of unselected terminals has been added to a group of selected terminals is larger than the metric values calculated using the offset value that is calculated using the number of selected terminals, an unselected terminal with a largest metric value is added to the group of selected terminals, until either the maximum value is less than or equal to the metric values calculated using the offset value that is calculated using the number of selected terminals or the number of selected terminals is equal to a maximum number for the terminals being selected.

12. The terminal selection method of claim 10, wherein the number of terminals being selected is equal to a multiplex number in spatial multiplexing at which plural terminals are communicated with at a same timing and at a same frequency.

* * * * *